July 29, 1941.  D. F. BABCOCK  2,250,925
PROCESS FOR THE SEPARATION OF ACETYLENE FROM ADMIXTURE WITH ETHYLENE
Filed June 10, 1938
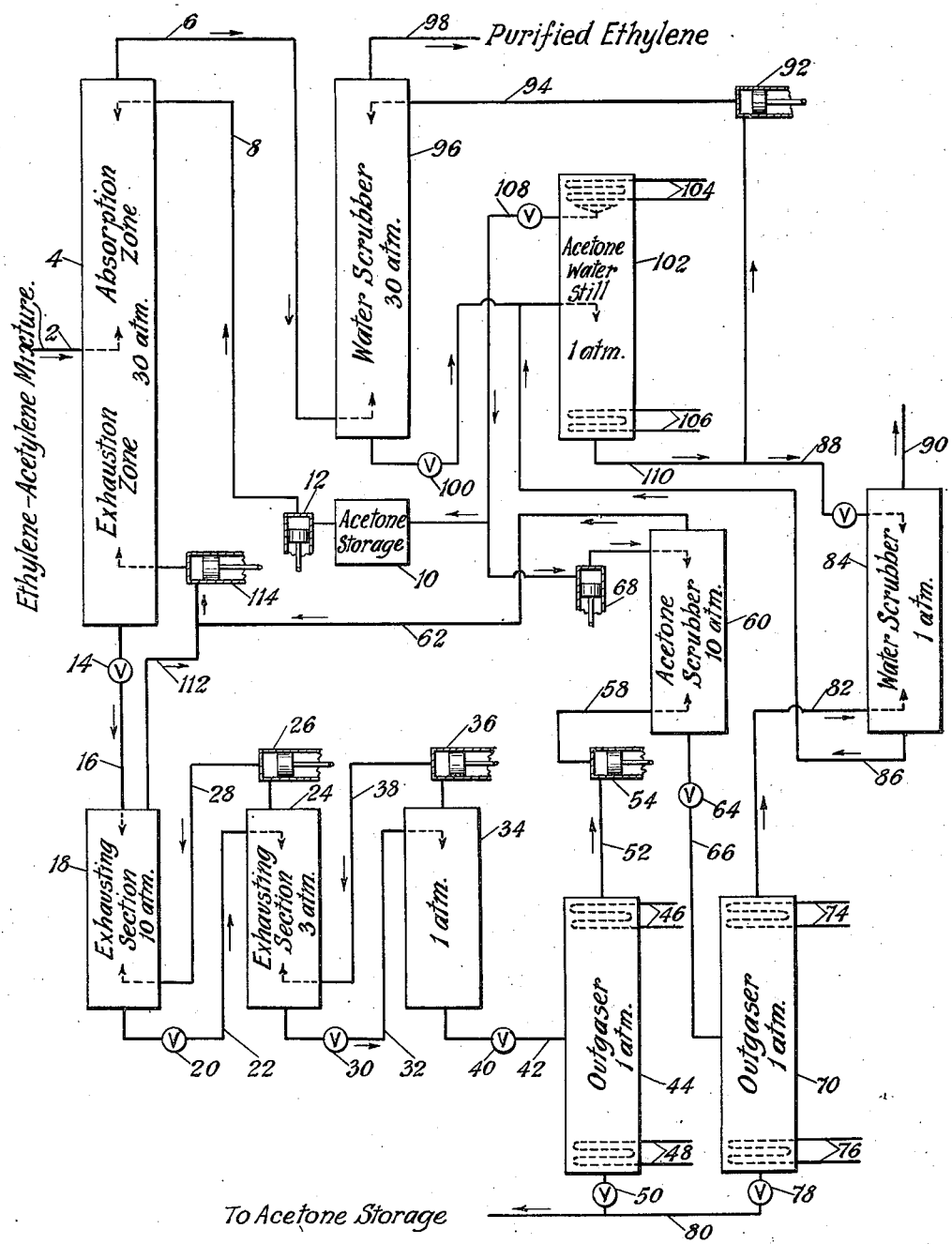
Dale F. Babcock INVENTOR.
BY
ATTORNEY

Patented July 29, 1941

2,250,925

UNITED STATES PATENT OFFICE 2,250,925

PROCESS FOR THE SEPARATION OF ACETYLENE FROM ADMIXTURE WITH ETHYLENE

Dale F. Babcock, Elmhurst, Del., assignor to E. I. du Pont de Nemours & Company, Wilmington, Del., a corporation of Delaware Application June 10, 1938, Serial No. 212,907

2 Claims. (Cl. 183—115)

This invention relates to a process for the separation of a gaseous mixture into its components and, more particularly, to a separation process involving the principle of absorption and, still more particularly, to the method of treatment of the liquors from an absorption process whereby the less soluble components are recovered essentially free of the more soluble components.

Components of a gaseous mixture may be separated and recovered by scrubbing said gaseous mixture with a suitable solvent so that the more soluble components are dissolved, leaving a permanent gas essentially free from said soluble components. The absorption liquor containing both the soluble components and some of the less soluble permanent gas may be further processed in a rectifying tower which is heated at the base to such a temperature that the less soluble material is driven from the liquid, leaving only the solvent and the components which are to be outgassed and recovered. Such a process is disclosed by G. O. Curme in his U. S. Patent No. 1,422,183. Other methods of separating gaseous components, such as by gas liquefaction and rectification, are well known.

The present process accomplishes the separation of gaseous components by a novel procedure that is much more economical than that hitherto employed.

This invention has as its object the separation of a gaseous mixture into its components by a novel and useful process. A further object is to accomplish this result with a minimum expenditure of power and a maximum of safety. A still further object is to separate a mixture of ethylene and acetylene into its components. Another object is to obtain a high yield of pure ethylene from a crude ethylene gas containing a relatively small amount of acetylene. Still another object is to completely separate acetylene from a crude ethylene gas containing a small amount of acetylene with practically no loss of ethylene. Other objects will appear hereinafter.

These objects are accomplished by processing the gaseous mixture according to the following combinations of steps. The gaseous mixture is fed under pressure into the middle of an absorption tower, down which a suitable solvent is passed. The solvent selected should not only have a high solvent power for one of the components but also should have a low solvent power for the remaining components. In other words, relative solvent power as well as absolute solvent power should be considered. The variables, temperature, pressure, rate of feed of solvent and of crude gas are adjusted so that the vapors issuing from the top of the absorber are essentially free of the more soluble components. The liquid produced at the base of the absorber, which is essentially saturated with both components, is expanded into the top of a second absorber which operates at a pressure lower than the first. The flash gases produced by this expansion, together with the other gases that are evolved in this absorber, are recompressed and fed into the base of the high pressure absorber. The liquid from the base of the intermediate pressure absorber is further expanded in a series of one or more stages, with the flash gases so produced recompressed and passed into the next higher pressure absorber. The liquid produced at the base of the lowest pressure absorber contains essentially all of the more soluble components originally present in the feed gas together with a small quantity of the less soluble components. This liquid is then boiled to expel the dissolved gases and the liquid recycled through the absorption system. The number of expansion stages selected depends upon the degree of efficiency desired. The greater the number of stages, the greater the efficiency but this efficiency is offset by the complexity of the process. For most separations, highly satisfactory results can be obtained by using three expansion stages. If the degree of purity required is not high or if the solvent is highly selective, two or even one stage of expansion will be sufficient.

This invention may be described as one in which the liquid from an absorption tower is expanded to some lower pressure in one or more steps. The gas evolved during each expansion is recompressed and passed counter-current to the liquid. In this manner the liquid becomes depleted in the less volatile components while the gas becomes enriched in these components.

The accompanying drawing is a flow sheet diagrammatically illustrating the invention. For simplicity, the following description of the process which refers to the drawing assumes that the crude gas contains acetylene as its more soluble component and ethylene as its less soluble component. Also the solvent used to absorb the acetylene is acetone, although any one of several other solvents could have been selected for this description.

The gas containing acetylene and ethylene was compressed to thirty atmospheres and fed into the middle of acetone absorber 4 through pipe line 2. Acetone from storage receiver 10 was pumped through pipe line 8 by means of pump 12 into the top of acetone absorber 4 at such a rate that the permanent gases leaving the absorber via conduit 6 were essentially free of acetylene. The liquid acetone essentially saturated with both ethylene and acetylene was expanded from the base of the absorber 4 through valve 14 and conduit 16 into the top of intermediate pressure exhausting section 18. The flash gas produced in this exhausting section together with the other gases evolved therein, passed through conduit 112 and compressor 114 back into the base of absorber 4. The intermediate pressure exhausting section 18 operated at approximately 10 atmospheres pressure. The heat liberated by the dissolving of the gases into the acetone in the high pressure absorber 4 was abstracted using cooling coils (not shown in the attached diagram). The flow of water through the cooling coils was adjusted so that the temperature within the absorber did not rise to above 40° C. Because of the refrigerating effect produced by the dissolved gases flashing from the liquid upon expansion through valve 14, exhausting section 18 operated somewhat below atmospheric temperature. The liquid produced at the base of exhausting section 18 was expanded into the top of exhausting section 24 through pipe line 22 and valve 20. This exhausting section operated at approximately 3 atmospheres pressure. The vent gas at the top of exhausting section 24 was compressed in compressor 26 and passed into conduit 28 into the base of exhausting section 18. The liquid at the base of exhausting section 24 was expanded into exhausting section 34 which operated at one atmosphere pressure. The vent gas from this exhausting section was compressed in compressor 36 and passed through conduit 38 into the base of exhausting section 24. The liquid from the base of exhausting section 34 was passed through valve 40 and conduit 42 into outgasser No. 44. Steam was passed through the coil 48 at such a rate that all of the gases were expelled from the acetone liquid. Essentially pure acetone liquid passed through valve 50 to the acetone storage. Cooling coil 46 located near the top of the outgasser reduced the temperature of the vent gases issuing through conduit 52 to approximately room temperature. This vent gas was compressed to 10 atmospheres in compressor 54 and passed into an acetone absorber 60 by way of conduit 58. Sufficient acetone was forced from the acetone receiver 10 by means of pump 68 into the top of acetone absorber 60 so that essentially all of the acetylene was dissolved from the gas issuing from the top of this absorber. This undissolved gas passed through conduit 62 into compressor 114 and was forced into main acetone absorber 4. The liquid from the base of absorber 60 was expanded through valve 64 and conduit 66 into outgasser 70 which was heated at the base with steam in calandria 76 and cooled at the top with water in condenser 74. The acetone freed of its dissolved gas at the base of outgasser 70 was passed through valve 78, and conduit 80 back to the acetone storage system. The gas issuing from the top of 70 via conduit 82 was essentially pure acetylene but was saturated with acetone vapor which was removed in water scrubber 84. Water was supplied to the top of this scrubber via conduit 88 at a sufficient rate to remove the acetone from the vent gas which issued through conduit 90. The acetone water solution from the base of scrubber 84 passed by way of conduit 86 into the middle of the acetone water still No. 102. Calandria 106 located at the base of this still was heated with steam and condenser 104 cooled with cooling water, so that essentially pure acetone and pure water was prepared. The acetone passed from the still by way of conduit 108 and returned to the acetone storage. The vent gas leaving the top of acetone absorber 4, which was washed free of acetylene by means of the acetone, was saturated with this substance. This acetone was recovered for further recycling to the unit by means of water scrubber 96. Water was supplied to this scrubber, which operated at 30 atmospheres, by means of pump 92. The vent gas issuing from the top of absorber 96 through conduit 98 was essentially pure ethylene. The liquid acetone-water solution produced at the base of absorber 96 was expanded through valve 100 into the middle of acetone-water still 102.

The following is a specific example of the application of this invention.

Example

The crude gas to be processed according to this invention contained 1% of acetylene, 98% ethylene and 1% of saturated hydrocarbons such as ethane and methane. This gas was compressed to 30 atmospheres and fed into the middle of absorber 4 at the rate of 650 cu. ft. per hour. Acetone was pumped into the top of this absorber at the rate of 1.4 cu. ft. per hour. The acetylene concentration of the gas leaving the top of this absorber was found to be less than 1/100 of 1%. The gases dissolved in the liquid at the base of absorber 4 contained approximately 90% ethylene and 10% acetylene. This liquid was expanded into exhausting section 18 and the gas from the top of this absorber was recompressed back into the first absorber. This gas contained approximately 2½% of acetylene. The staged expansion of the liquid was continued as described above. The gas evolved at the top of the three atmosphere absorber contained approximately 5% acetylene and the gas from the top of the one atmosphere absorber contained approximately 15% of acetylene. In each case the major portion of the residual gas was ethylene. The vapor issuing from the top of outgasser 44, on an acetone-free basis, contained approximately equal quantities of ethylene and acetylene. The volume of this gas was 15 cu. ft. per hour. This gas was compressed to 10 atmospheres and again scrubbed with acetone with the undissolved gases returning to the initial absorber. The acetone liquid was then out-gassed, producing a vapor which on an acetone-free basis contained approximately 85% acetylene and 15% ethylene.

Summarizing, it will be seen that the process produces an ethylene fraction containing less than 1/100% of acetylene and an acetylene fraction containing in excess of 85% of this material. The volume of the original ethylene lost with the acetylene amounts to less than ¼ of 1% of the total. If the staged expansion process had not been used, the acetylene concentration would have been but 10% and the fraction of the total ethylene lost with the acetylene would have been 10% of that available.

The absorber 4 contains two zones, an absorption zone which exists between the feed inlet and the top of the absorber and an exhaustion zone which exists between the bottom of the absorber and the said inlet. By the term "exhaustion zone" as used herein and in the claims, I mean a zone in which the solvent becomes enriched with respect to the more soluble component or components and depleted with respect to the less soluble component or compounds. This result may be accomplished by contacting the solution with a vapor which contains a higher concentration of the more soluble component or components than the concentration of this component or components in the vapor dissolved in the solvent.

The composition of the gas to be processed by this invention is not limited to that described above, nor is it limited to a mixture containing only two components. For example, the gasoline may be recovered from natural gas by this process or if desired, the carbon dioxide may be recovered from flue gases.

In order to assist the flashing of the vapors from the liquids in intermediate absorption chambers, it may be desirable to heat the liquid at the base. The addition of heat will be especially advantageous in the lowest pressure absorber.

In the description of the invention there was considerable evolution of heat in the first high pressure absorber. By far the major portion of this heat is produced by the solution of ethylene into the acetone. Instead of cooling the absorber with water, it would be possible to saturate the acetone with ethylene and then cool the saturated liquid prior to introducing it into the high pressure absorber. Since the quantity of acetylene to be absorbed by the acetone is quite small, the temperature rise in the absorber will be greatly diminished by this preliminary saturation with ethylene. This pre-saturation of the solvent with the less soluble component prior to passing it to the absorption system is also applicable to other absorption processes as well as the separation of $C_2H_2$ and $C_2H_4$.

In the example quoted above, the relative solubility of acetylene and ethylene in acetone are approximately 7:1. Because of this high solubility ratio, the more soluble components were produced as a nearly pure fraction. For those cases where the solvent is less selective, a more complex expansion system must be used in order to produce the same results.

The use of water as a solvent is always attractive because of its low cost. Water is particularly attractive in this instance because of its high solubility ratio for acetylene over ethylene (approximately 9:1), although this advantage is somewhat offset by the poor absolute solubility of acetylene in water; namely, about $\frac{1}{25}$ that of acetone.

If in the example described above, the absorption liquid produced at the base of the high pressure absorber had been expanded directly to atmospheric pressure and then outgassed, the vapors would have contained but 10% acetylene, the remaining 90% being ethylene. Using the 3-stage expansion, a gas containing approximately 50% acetylene is prepared and by reabsorbing this gas and repeating the expansion process, an 85% acetylene gas is produced.

It is apparent that many widely different embodiments of this invention may be made without departing from the spirit and scope thereof and therefore it is not intended to be limited except as indicated in the appended claims.

I claim:

1. A process for the separation of acetylene from admixture with ethylene which comprises bringing said gaseous mixture into contact with a solvent having a higher solvent power for acetylene than for ethylene and recovering ethylene freed of acetylene as a gas, reducing the pressure on the resulting solution in at least two steps and bringing the gas evolved in each step of pressure reduction into contact with the solution under the preceding elevated pressure, said process being further characterized in that the solvent is saturated with ethylene and the heat of solution removed prior to contacting same with the gaseous mixture.

2. A process for the separation of acetylene from admixture with ethylene which comprises bringing said gaseous mixture into contact with acetone saturated with ethylene and recovering ethylene freed of acetylene as a gas, reducing the pressure on the resulting solution in at least two steps and bringing the gas evolved in each step of pressure reduction into contact with the solution under the preceding elevated pressure.

DALE F. BABCOCK.